United States Patent
DeBusk

(12) 
(10) Patent No.: US 7,790,033 B1
(45) Date of Patent: Sep. 7, 2010

(54) SURFACE WATER TREATMENT USING FLOCCULATION AND ASSOCIATED METHODS

(76) Inventor: Thomas A. DeBusk, 3208 Westchester Dr., Cocoa, FL (US) 32926

( * ) Notice: Subject to any disclaimer, the term of this patent is extended or adjusted under 35 U.S.C. 154(b) by 200 days.

(21) Appl. No.: 12/126,208

(22) Filed: May 23, 2008

Related U.S. Application Data

(60) Provisional application No. 60/946,507, filed on Jun. 27, 2007.

(51) Int. Cl.
*C02F 3/32* (2006.01)
*C02F 1/52* (2006.01)

(52) U.S. Cl. .................. 210/602; 210/631; 210/702; 210/747; 210/170.01

(58) Field of Classification Search ............ 210/602, 210/631, 702, 705, 711, 713, 747, 170.01, 210/170.03, 170.08
See application file for complete search history.

(56) References Cited

U.S. PATENT DOCUMENTS

| | | | |
|---|---|---|---|
| 2,352,772 A | 7/1944 | Darby | |
| 3,579,443 A | 5/1971 | Horst | |
| 4,507,206 A | 3/1985 | Hughes | |
| 4,668,388 A * | 5/1987 | Dibble et al. | 210/150 |
| 4,765,914 A | 8/1988 | Marikovsky et al. | |
| 4,818,416 A | 4/1989 | Eberhardt | |
| 5,456,844 A | 10/1995 | Lobb | |
| 5,733,453 A | 3/1998 | DeBusk | |
| 5,766,474 A | 6/1998 | Smith et al. | |
| 5,893,978 A | 4/1999 | Yoda et al. | |
| 5,938,936 A * | 8/1999 | Hodges et al. | 210/705 |
| 5,993,649 A | 11/1999 | DeBusk et al. | |
| 6,251,264 B1 | 6/2001 | Tanaka et al. | |
| 6,413,426 B1 | 7/2002 | DeBusk et al. | |
| 6,692,641 B2 | 2/2004 | DeBusk et al. | |
| 6,837,994 B2 | 1/2005 | Izawa | |
| 6,986,845 B2 | 1/2006 | DeBusk et al. | |
| 7,014,776 B1 | 3/2006 | DeBusk | |
| 7,179,387 B2 | 2/2007 | DeBusk | |

OTHER PUBLICATIONS

Lake Apopka Water Hyacinth Demonstration Project, Second Semi-Annual Report prepared for St. Johns River Water Management District, prepared by Amasek, Inc., Apr. 4, 1991.

DeBusk et al., "Effectiveness of Mechanical Aeration in Floating Aquatic Macrophyte-Based Wastewater Treatment Systems," Journal of Environmental Quality, vol. 18, No. 3, pp. 349-354, Jul.-Sep. 1989.

(Continued)

*Primary Examiner*—Fred Prince
(74) *Attorney, Agent, or Firm*—Jacqueline E. Hartt; Lowndes, Drosdick, Doster, Kantor & Reed, P.A.

(57) ABSTRACT

A method and system for removing pollutants from water are provided. The system includes at least one settling basin having shallow and deep areas. Coagulants can be added to bring pollutants down to the bottom surface of the basin. During dry periods, the deep areas retain a level of water therein, and the flocs that have settled on the bottom of the shallow areas will dry out, and can be tilled into the soil until re-flooding.

22 Claims, 1 Drawing Sheet

OTHER PUBLICATIONS

Clark, Mark, "Biophysical Characterization of Floating Wetlands (Flotant) and Vegetative Succession of a Warm-Temperature Aquatic Ecosystem," Dissertation, University of Florida, 2000.

Wen, Li and Recknagel, Friedrich, "In Situ Removal of Dissolved Phosphorus in Irrigation Drainage Water by Planted Floats: Preliminary Results from Growth Chamber Experiment," Agriculture, Ecosystems and Environment, vol. 90, pp. 9-15, Jun. 2002.

Youngchul, Kim and Wan-Joong, Kim, "Roles of Water Hyacinths and Their Roots for Reducing Algal Concentration in the Effluent from Waste Stabilization Ponds," Water Research, vol. 34, No. 13, pp. 3285-3294, Sep. 1, 2002.

* cited by examiner

SURFACE WATER TREATMENT USING FLOCCULATION AND ASSOCIATED METHODS

CROSS-REFERENCE TO RELATED APPLICATION

This application claims priority to provisional application Ser. No. 60/946,507, filed Jun. 27, 2007.

BACKGROUND OF THE INVENTION

1. Field of the Invention

The present invention relates to systems and methods of surface water purification.

2. Description of Related Art

The removal of pollutants from surface waters, such as lakes, ponds, streams, and canals, has proven technically challenging and costly. Chemical coagulants have been used successfully to treat surface waters, but these chemical-based treatment systems can be expensive and problematic with respect to environmental concerns about the disposal of chemical residues.

Surface water chemical treatment systems usually obtain feedwaters from a polluted source via either a gravity flow or pumped flow of water through a pipe or culvert. A chemical coagulant is injected into the pipe, and water turbulence provides mixing of the coagulant and water. This coagulant-water mixture is then fed into a large settling basin, typically an earthen pond, with a relatively long (e.g., 3-24 hour) hydraulic retention time. A chemical precipitate (termed a "floc") forms in the water as a result of coagulant addition. The flocs and associated pollutants settle in the quiescent pond environment, and the clarified water, relatively free of pollutants, exits the pond.

Over time, a layer of floc or chemical residue builds up on the bottom of the settling pond, and this material periodically must be collected, dried, and disposed of. A typical approach used for chemical residue handling is to establish and maintain chemical floc "drying beds" adjacent to the pond, into which the floc material periodically is pumped from the settling basin and allowed to dry. The dried chemical residue and associated pollutants typically is then hauled away to a disposal site. The selection of an appropriate disposal site, however, can be a problem, due to concerns about adverse environmental effects of the residue constituents (which include the active ingredient of the coagulant, often a metal, and the pollutants that have been removed from the water).

Chemical treatment systems require moderate amounts of land, with the settling pond and the floc residue drying beds comprising the greatest area requirement. There exists a compromise between settling pond size and chemical dose; to a certain extent, the larger the settling basin (and the more effective it is for floc removal), the lower the chemical dose required to accomplish effective pollutant removal. Because operating costs associated with chemical use can be quite high, it is important to incorporate adequate settling basin area in the treatment system.

SUMMARY OF THE INVENTION

The present invention is directed to a method and system for removing pollutants from water. The system comprises at least one settling basin having shallow and deep areas. Coagulants can be added to bring pollutants down to the bottom surface of the basin. During dry periods, the deep areas retain a level of water therein, and the flocs that have settled on the bottom of the shallow areas will dry out, and can be tilled into the soil until re-flooding.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
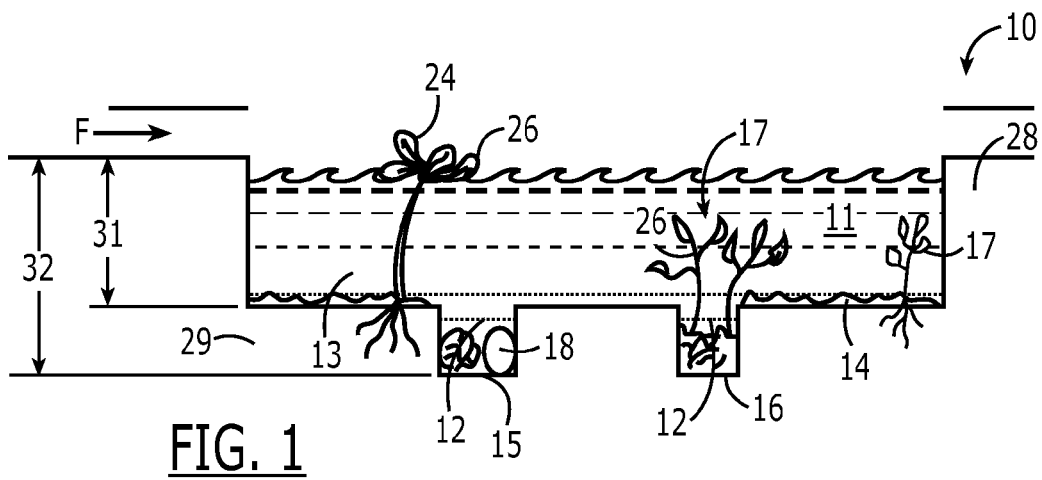
FIG. 1 is a side cross-sectional view of a water treatment system of the present invention.
Figure 2:
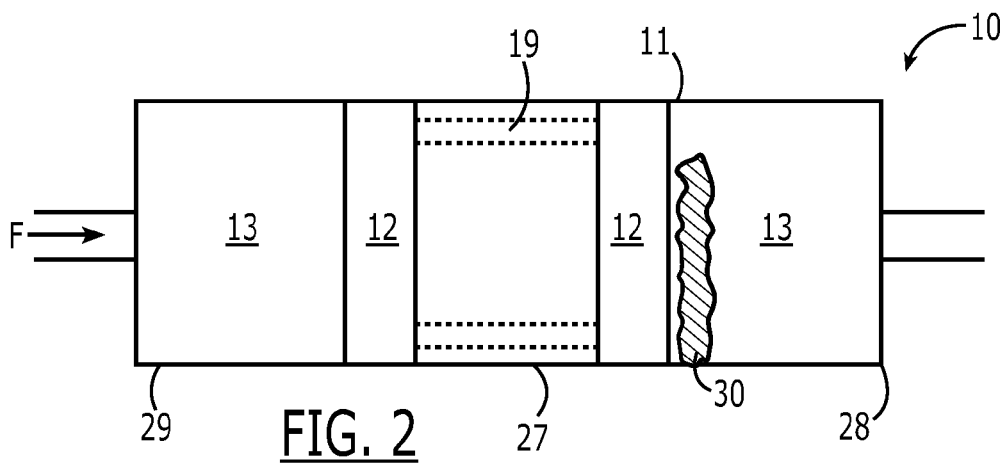
FIG. 2 is a top plan view of an exemplary embodiment of the surface water treatment system of the present invention.
Figure 3:
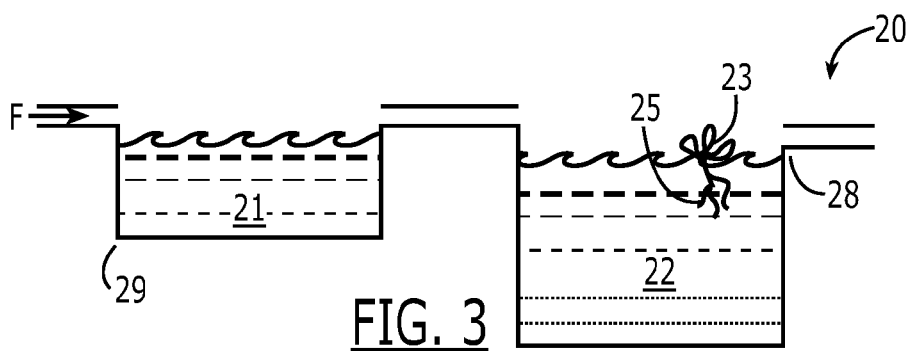
FIG. 3 is a cross-sectional view of an alternate embodiment of a surface water treatment system.

A description of preferred embodiments of the present invention will now be presented with reference to FIGS. 1-3.

The present invention describes a design and management approach for eliminating the need for off-site disposal of chemical residues, while maintaining a modest system area requirement and providing effective floc removal in a settling pond.

A first embodiment of the system 10 (FIGS. 1 and 2) comprises a settling pond 11 containing both deep zones 12 and shallow zones 13, these zones having depths 32 and 31, respectively. The shallow zones 13 typically comprise approximately 50% of the pond area, or greater. The exact elevations of both shallow 13 and deep 12 zones depend on factors such as soil type, groundwater elevations, the seasonal availability of surface water to be treated, and whether or not the inflow to the settling pond 11 is pumped or fed by gravity. The deep zones 12 in the pond 11 typically are configured as bands, oriented perpendicular to flow F, so as not to encourage water short-circuiting during normal operations.

As an alternative configuration (FIG. 3), rather than one large pond containing both shallow and deep zones, the settling basin complex 20 can comprise multiple ponds 21, 22, . . . in series, some of which are shallow 21, and some of which are deep 22.

During normal operations, water passes through the settling pond 11 (or ponds 21, 22, . . . in series), and chemical flocs 14 resulting from coagulant addition settle onto the bottoms 15,16 of both deep 12 and shallow 13 zones (or ponds 21, 22, . . . ). Periodically, such as once every one or two years, although this is not intended as a limitation, the water level in the settling pond 11 (or pond complex) is lowered to an elevation below that of the bottom 16 of the shallow zones 13, but above that 15 of the deep zones 12. The lowering of water levels can be accomplished either passively (by evaporation and seepage) or actively (by pumping). Upon exposure to air and sunlight, the floc 14 that has settled on the bottom 16 of the shallow zones 13 dries. As a result of drying, the volume of most chemical flocs is reduced dramatically, for example, in the range of 90-98%. The dried chemical residue subsequently can be tilled (using conventional farm machinery) into the soil at the bottom 16 of the shallow zones 13, and the system 10 re-flooded. This incorporation of material into the soil of the settling basin 11 obviates the need to export chemical residues from the treatment system 10.

To enhance floc removal within the settling basin complex, vegetation can be stocked in the shallow 13 and/or deep 12 zones (ponds). This vegetation typically can consist of floating aquatic plants 23 such as water hyacinth, but in some cases could consist of emergent 24 or submerged 17 macrophytes. Both the presence of plant roots 25 (in the case of floating plants 23) and stems/leaves 26 (in the case of emergent 24 and submerged 17 macrophytes) create a filtering action, and also dampen wind and wave action. Both of these characteristics enhance floc settling. Additionally, the wetland vegetation 17,23,24 helps remove selected pollutants (e.g., nitrate and ammonium-nitrogen) that are not readily removed by chemical additions.

Another important function that can be served by the settling basin complex is to provide pH control. Often, the addition of chemicals results in a lowering of the pH in the water, owing to the acidic nature of many coagulants, such as selected iron and aluminum compounds. In conventional chemical treatment systems, a supplemental base-containing chemical, such as sodium hydroxide, often must be added to achieve a target outflow pH level (often circumneutral) prior to discharge. The cost of adding this basic chemical may equal or even exceed the cost of the coagulant itself.

In the present invention, design features incorporated into the settling basin 11 or pond(s) 21,22, . . . can serve to achieve target pH levels prior to discharge, thus obviating the need for addition of basic chemical. For example, limerock (principally calcium carbonate) outcroppings or berms 30 can be added within at least one of a mid-region 27 and an outflow region 28 of the settling basin 11 or pond(s) 21,22, . . . , and the acidic waters resulting from the inflow region 29 coagulant addition slowly dissolves the calcium carbonate, resulting in an increase in water pH prior to discharge. Moreover, certain vegetation types can also influence pH. For example, the inclusion of submerged macrophytes or algae in the deep or shallow zones can increase the pH of the water column as a result of the plant's assimilation of carbon dioxide during photosynthesis. A combination of both submerged plants and limerock in the settling basins 11 (ponds 21,22, . . . ) may prove particularly effective for pH control, since many types of submerged vegetation thrive on the alkaline microenvironments that would be provided by limerock outcroppings.

In the shallow zones 13/ponds 21, the plants are allowed to dry down when the pond water level is dropped, and are tilled into the soil along with the chemical floc. Additionally, when either floc levels and/or plant biomass build up to unacceptable levels in the deep zones 12 (ponds 22), then these materials can be pumped or otherwise conveyed onto the shallow areas 13,21 during the drydown period, where they can be incorporated into the soil after drying.

Similar to the chemical residue that results from coagulation, aquatic plants have a high water content (~95%), and therefore exhibit a dramatic volume reduction upon drying. The concomitant tilling of chemical flocs and aquatic plants into the bottom of the shallow zones can be beneficial in several respects. The chemical flocs typically contain some residual pollutant removal capability, so any nutrients such as phosphorus that are released by the plants during their decomposition in the soil are effectively immobilized by the incorporated floc residue. Additionally, the aquatic plants contribute organic matter to the soil, and through this addition of organic carbon, tend to moderate the increase in metal and pollutant concentrations in the soil as chemical residues are tilled in. The net effect is to gradually build small amounts of soil over time.

Periodic drydown of shallow zones 13 in the settling basin 11 complex can be readily accomplished in locations that exhibit a pronounced wet and dry season. As an alternative, one or more pumps 18 deployed in the deep zones 12 can be used to "dewater" the shallow zones 13. Additionally, piping or trenches 19 can be deployed to interconnect deep zones 12 or ponds 22, and if surface waters need to be treated during the "drydown" period, these deep areas 12,22 can be maintained in service. If needed, parallel trains of settling basins also can be established at each treatment facility, so one basin can be maintained on-line while the other is being dried down.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and method illustrated and described herein are by way of example, and the scope of the invention is not limited to the exact details of construction and use.

Having now described the invention, the construction, the operation and use of preferred embodiments thereof, and the advantageous new and useful results obtained thereby, the new and useful constructions, and reasonable equivalents thereof obvious to those skilled in the art, are set forth in the appended claims.

What is claimed is:

1. A method for removing pollutants from water comprising:
    directing water desired to be treated into an enclosure having a first area having a first depth and a second area having a second depth greater than the first depth;
    adding a coagulant to at least one of the enclosure and an inlet of the enclosure for precipitating pollutants in flocs to a bottom of the enclosure;
    permitting a water level in the enclosure to lower so as to expose at least a portion of the first area;
    permitting the exposed portion of the first area and flocs settled thereon to dry; and
    tilling the dried flocs into the enclosure bottom.

2. The method recited in claim 1, wherein the second area comprises a plurality of second areas configured in substantially parallel bands, the bands substantially perpendicular to an incoming flow of water to be treated.

3. The method recited in claim 1, wherein the first area and the second area comprise a first and a second pond in fluid communication with each other.

4. The method recited in claim 1, wherein the water level is lowered through at least one of passively and actively.

5. The method recited in claim 1, further comprising stocking the enclosure with aquatic vegetation comprising at least one of a floating aquatic macrophyte, an emergent macrophyte, and a submerged macrophyte for enhancing floc settling and for assisting in pollutant removal from the water.

6. The method recited in claim 1, further comprising discharging treated water from the enclosure, and raising a pH of the treated water prior to the discharging step.

7. The method recited in claim 6, wherein the pH-raising step comprises exposing water in the enclosure to calcium carbonate.

8. The method recited in claim 7, wherein the pH-raising step further comprises stocking the enclosure with aquatic vegetation comprising a submerged plant.

9. The method recited in claim 1, further comprising, during the floc-drying step, pumping settled floc from the second area to the first area for drying.

10. The method recited in claim 9, further comprising stocking the enclosure with aquatic vegetation comprising at least one of a floating aquatic macrophyte, an emergent macrophyte, and a submerged macrophyte, and during the floc-drying step, further transferring biomass comprising the aquatic vegetation from the second area to the first area for drying.

11. The method recited in claim 1, wherein the second area comprises a plurality of second areas, and further comprising interconnecting the second areas to achieve fluid communication therebetween.

12. A system for removing pollutants from water comprising:
   an enclosure having a first area having a first depth and a second area having a second depth greater than the first depth;
   a channel for directing water desired to be treated into an inlet of the enclosure;
   means for adding a coagulant to at least one of the enclosure and the inlet of the enclosure for precipitating pollutants in flocs to a bottom of the enclosure;
   means for lowering a water level in the enclosure so as to expose at least a portion of the first area for drying the flocs settled thereon; and
   means for tilling the dried flocs into the enclosure bottom.

13. The system recited in claim 12, wherein the second area comprises a plurality of second areas configured in substantially parallel bands, the bands substantially perpendicular to water to be treated entering the enclosure via the inlet.

14. The system recited in claim 12, wherein the first area and the second area comprise a first and a second pond in fluid communication with each other.

15. The system recited in claim 12, wherein the water-level-lowering means comprises a pump in fluid communication with the enclosure.

16. The system recited in claim 12, wherein the enclosure comprises aquatic vegetation growing in the water comprising at least one of a floating aquatic macrophyte, an emergent macrophyte, and a submerged macrophyte for enhancing floc settling and for assisting in pollutant removal from the water.

17. The system recited in claim 12, further comprising means for discharging treated water from the enclosure via an outlet, and for raising a pH of the treated water upstream of the outlet.

18. The system recited in claim 17, wherein the pH-raising means comprises a source of calcium carbonate positioned in communication with the water in the enclosure.

19. The system recited in claim 18, wherein the pH-raising means further comprises aquatic vegetation growing in the enclosure comprising a submerged plant.

20. The system recited in claim 12, further comprising a pump in fluid communication with the first and the second areas, for pumping settled floc from the second area to the first area for drying.

21. The system recited in claim 20, further comprising aquatic vegetation growing in the enclosure comprising at least one of a floating aquatic macrophyte, an emergent macrophyte, and a submerged macrophyte, and wherein the pump is further for pumping biomass comprising the aquatic vegetation from the second area to the first area for drying.

22. The system recited in claim 12, wherein the second area comprises a plurality of second areas, and further comprising a fluid conveyance positioned for interconnecting the second areas to achieve fluid communication therebetween.

* * * * *